Dec. 28, 1965  B. J. MILLEVILLE  3,226,081
LUBRICATING SYSTEM FOR VALVE ACTUATOR
Original Filed Aug. 18, 1953
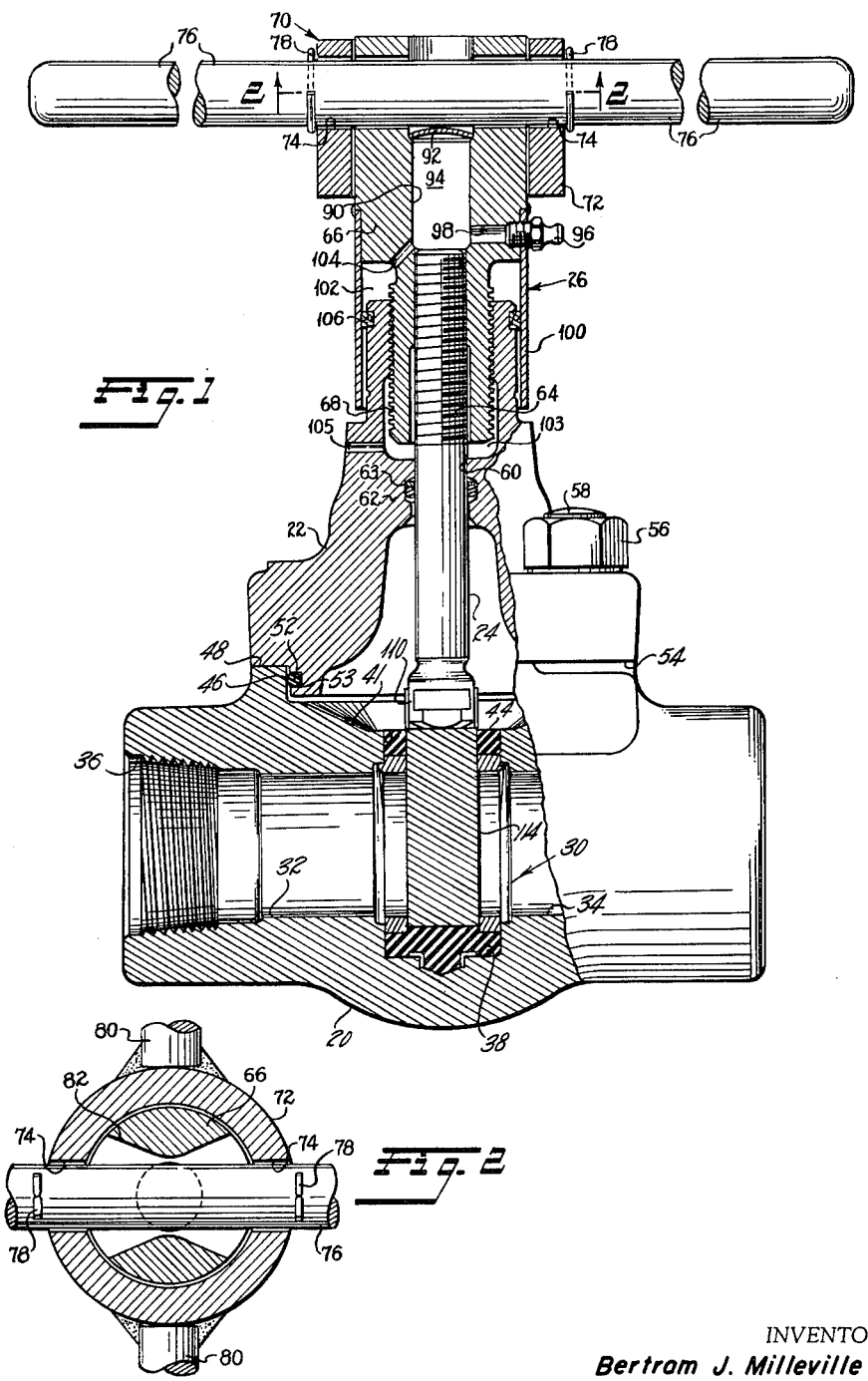
INVENTOR.
Bertram J. Milleville United States Patent Office 3,226,081
Patented Dec. 28, 1965

3,226,081
LUBRICATING SYSTEM FOR VALVE ACTUATOR
Bertram J. Milleville, East Longmeadow, Mass., assignor, by mesne assignments, to Rockwell Manufacturing Company, Pittsburgh, Pa., a corporation of Pennsylvania
Original application Aug. 18, 1953, Ser. No. 374,909, now Patent No. 3,071,343, dated Jan. 1, 1963. Divided and this application Oct. 10, 1962, Ser. No. 229,694
6 Claims. (Cl. 251—355)

This application is a division of application Serial No. 374,909, filed August 18, 1953, now Patent No. 3,071,343, granted January 1, 1963.

This invention relates to valves and more particularly to gate valves for controlling the flow of abrasive laden fluids.

An unfulfilled need and demand has long existed in the valve art for a commercially practical valve capable of effectively controlling the flow of abrasive laden fluids particularly those which are piped through a conduit system at high pressures. An example of such a system in which the valves of the present invention have particular utility is the mud supply system employed in the drilling of oil wells. In such a system prepared mud is circulated continuously around the drill head and returned to a reservoir after removal of chips and shale. Accumulations of sand and rock fines in the mud soon make it extremely abrasive. Ordinarily the mud is circulated at a pressure of some 1500 pounds per square inch at a temperature which may reach 200° F.

Tests have shown that prior valves of conventional construction installed in a mud line are subject to rapid deterioration particularly in the closed position. Consequently valves, to be effective in such an environment, must provide an absolutely tight seal in closed position for extended periods of use. Further, experience has shown that since such valves are subject to mishandling and abuse in the field they must be capable of providing the required seal despite poor maintenance and improper operation by unskilled attendants. Thus, insofar as possible, the operation of the valve must be made independent of the quality of maintenance and the skill of the operator.

In addition such valves must be susceptible of easy repair in the field at minimum expense without breaking the piping hook-ups in which they are installed. This condition is especially important where the valves are installed in vertical standpipes having an upper portion which is not independently supported.

It is also essential that the valves be easy to operate despite poor maintenance since it may be expected that if high operating torques are required either initially or after prolonged service the operators may fail to close the valves fully thus permitting a leak which ordinarily remains undetected until the valve is ruined.

The prior art is replete with unsuccessful attempts to provide a valve for mud line and similar service which satisfies the three principal criteria, namely, the provision of an absolutely tight closing seal, ease of field repairability or replacement and ease of operation.

It has been found that the operating torque necessary to fully close many prior valves is excessively high so that the valves may accidentally be left in partially open position in which position they are subject to rapid deterioration.

Accordingly, it is the primary purpose and object of the present invention to provide improved valves for controlling the flow of abrasive fluids which for the first time overcome the foregoing difficulties and provide a tight closed seal, ease of operation with minimum maintenance and repairability in the field at minimum expense.

It is also an object of the present invention to provide a novel operator for a gate valve which is sealed, which may be positively lubricated, which requires a minimum of applied torque and provides increased operating speeds.

It is an additional object of the present invention to provide an improved valve operator which is of simple rugged construction to minimize the cost of manufacture and repair.

It is also an object of the present invention to provide a novel valve assembly including a gate and gate operator and a replaceable resilient valve seat insert which cooperate in a novel manner to provide an improved seal.

Additional objects and advantages will become apparent as the description proceeds in connection with the drawings in which:

FIGURE 1 is a vertical section with parts in elevation of the improved valve of the present invention; and FIGURE 2 is a transverse section taken along line 2—2 of FIGURE 1 illustrating a portion of the improved valve operator.

Referring now particularly to FIGURE 1, the principal components of the valve there shown are the body 20, the bonnet 22, the valve stem 24, the valve operator assembly 26, the valve gate 28, and the replaceable valve seat insert 30. The valve body 20 which is preferably of integral construction is formed with coaxial fluid passages 32 and 43 which terminate at their outer ends in threaded sections 36 for connection to a fluid conduit in conventional manner. At their inner ends the passages 32 and 34 communicate with an enlarged valve seat chamber 38 which extends to the top of the valve body. The body 20 is of shallow construction to facilitate inspection and replacement of the insert 30.

The opposed annular end faces 42 and 44 of the valve seat chamber 38 surrounding the flow passages 32 and 34 are parallel and perpendicular to the flow axis and are machined to provide flat smooth seating surfaces for the insert 30. The upper portion of the chamber 38 merges into an annular bonnet receiving portion 46 which is surrounded by a flat machined annular flange 48. The bonnet 22 is provided at its lower surface with a pilot flange 50 carrying a rubber O-ring 52 in a recess 53 which is compressed and sealingly engages the inner surface of the bonnet receiving recess 46 in the valve body. The bonnet is rigidly secured to the body by means of four nuts 56 (one shown) threaded onto the upper ends of studs 58 mounted in the body 20 urging a flat machined flange surface 54 on the bonnet into tight surface contact with the mating flange surface 48 of the body. The flat surfaces 48 and 54 are perpendicular to the axis of valve stem 24 so that when nuts 56 are drawn tight they locate the valve stem exactly perpendicular to the flow axis through the valve seat chamber 38.

It will be noted that by virtue of this extremely simple construction the valve can be disassembled, that is, the bonnet, stem and gate removed by merely removing four nuts 56 when replacement, inspection or repair of the valve seat becomes necessary. Further since the body is of integral construction the connection between the body and the fluid conduits need not be broken when the bonnet is removed which significantly decreases both the time and expense necessary to effect replacement of the insert 30. It has been found in practice that replacement of the insert may be accomplished in five minutes or less.

The valve stem 24 is slidably received in an aperture 60 in the bonnet in which an O-ring 62 is positioned below a washer 63 and is formed at its upper end with a thread 64 for engagement with mating internal threads on a yoke bushing 66. The novel use of the O-ring 62 produces much less friction than the conventional stem packing and consequently reduces the required operating torque. The bushing 66 has external threads 68 which engage internal threads formed on the upper end of the bonnet 22. The external and internal threads on the yoke bushing are of opposite hand to provide a compound thread arrangement for moving the stem 24 axially of the bonnet upon rotational and axial movement of the yoke bushing 66. When the external and internal threads of the yoke bushing are of the same pitch the stem moves axially at double the rate and distance of axial movement of the yoke bushing during opening and closing of the valve. This compound thread arrangement decreases the number of turns of the yoke bushing necessary to effect full closing or opening of the valve and reduces the tendency of operators to leave the valve in partially open position. This arrangement also eliminates the special support and fastening ordinarily required for the yoke bushing to bonnet bearing. Further, it reduces the relative motion between the yoke bushing and stem, thus decreasing the length of the stem and the number of stem threads.

An impactor handle assembly 70 is provided for manual rotation of the yoke bushing 66 to open and close the valve. The handle assembly includes a hub 72, sleeved over the yoke bushing 66 and having aligned apertures 74 to receive a bar 76 of the handle assembly. The bar 76 is held in place by cotter pins 78. The other bar 80 of the handle assembly is welded to the hub 72 as shown in FIGURE 2. The bar 76 as shown particularly in FIGURE 2 extends through a slot 82 of hourglass form in the yoke bushing 66 to permit limited rotational movement of the handle assembly with respect to the yoke bushing 66 to obtain the desired impactor effect.

The relatively small diameter of the threads on the yoke bushing 66 provides a relatively large mechanical advantage for a handwheel of given diameter which further reduces operating torque.

The outer end of the yoke bushing is bored as at 90 and closed by a friction tight plug 92 to form a lubricant chamber 94 to which lubricant is supplied under pressure through a conventional check valve fitting 96 and a passage 98. A tubular shield 100 is welded or otherwise rigidly secured to the yoke bushing 66 and projects downwardly over the upper end of the bonnet 22 to form therewith an outer lubricant chamber 102. The position of the lower edge of the shield 100 indicates the position of the gate which obviates the necessity for exposing the stem end for this purpose. The chamber 102 receives lubricant from the inner chamber 94 through a passage 104 and is closed at its lower end by an annular seal 106 positioned on the bonnet. Lubricant which passes into space 103 between the bushing 66 and bonnet 22 may escape through exhaust port 105.

In its full open position the lower edge of the gate is substantially flush with the top of the flow passages 32 and 34. As the valve is moved to this position the stem 24 rises faster than the bushing 66 decreasing the size of chamber 94. At the same time the size of chamber 102 increases. During this operation lubricant passes from chamber 94 to chamber 102. As the valve is closed reverse lubricant flow occurs from chamber 102 to chamber 94.

This construction permits positive lubrication of all of the threads and at the same time protects all of the threads from dirt and abrasive particles by the use of a single seal thus assuring their operation with minimum friction loss and is of simple, rugged and inexpensive construction.

The gate 28 which is of hardened steel with a corrosion resistant plate to protect the gate and reduce friction is of rectangular cross section and provided with smooth opposite parallel flat side faces 112 and 114 and arcuate upper and lower surfaces. The gate 28 is mounted at the lower end of the stem 24 by means of a T-slot connection 110 to permit limited lateral movement of the gate 28 with respect to the stem 24.

This construction compensates automatically for any minor inaccuracies in the alignment of the stem and gate and prevents the transmission to the stem of lateral forces as the gate is moved by fluid pressure into sealing position. Thus freedom of movement of the stem is assured despite the application of high fluid pressures to the gate within the valve body. Further since the stem and gate are separate parts they may be constructed of different materials selected to suit the separate service requirements of the stem and gate thus decreasing the expense of the assembly.

The structure and function of the composite valve seat insert 30 and other features of the valve are disclosed more fully and claimed in copending application Serial No. 374,909 of which this application is a division.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a gate valve; a body; a bonnet removably secured to said body, said bonnet having an internally threaded portion; a valve stem reciprocably received in an aperture in said bonnet and having a threaded portion at its upper end and carrying a valve gate at its lower end; a stem operator having external and internal threads of opposite hand engaging, respectively, the threads on said bonnet and said stem; means forming a first lubricant chamber within said stem operator adjacent the upper end of said stem; means forming a second lubricant chamber externally of said stem operator adjacent the upper end of said bonnet; means for introducing lubricant into said first chamber to lubricate the threads on said stem, and means connecting said second lubricant chamber to said first lubricant chamber whereby additional lubricant is supplied to the threads on said bonnet.

2. The valve according to claim 1 together with means venting the spaced formed within said bonnet at the inner end of said stem threads and said bonnet threads to permit the flow of lubricant through said threads.

3. The gate valve according to claim 1 wherein said means forming said second lubricant chamber includes a sleeve secured to said stem operator and extending downwardly over the upper end of said bonnet and a sealing ring mounted on said bonnet adjacent the upper end thereof and sealingly engaging the inner surface of said sleeve.

4. In a gate valve; a body; a bonnet removably secured to said body, said bonnet having an internally threaded portion; a valve stem reciprocably received in an aperture in said bonnet and having a threaded portion at its upper end and carrying a valve gate at its lower end; a stem operator provided with a bore having threads along at least a portion of its length, said threads engaging the threads on said stem; means closing said bore above said threads; means forming inlet and outlet passages in said stem operator for lubricant above said threads in said bore; means forming external threads on said stem operator of opposite hand from said threads in said bore, said external threads engaging the threads on said bonnet; means forming a sealed space around said bonnet and said operator adjacent the outer end of said lubricant outlet passage; and means forming a vent for the space between said bonnet and the lower end of said stem operator whereby lubricant introduced through said lubricant inlet passage is applied directly to said threads in said bore and indirectly to said external threads through said lubricant outlet passage.

5. A lubricating system for a rising stem type valve, having a valve housing and a bonnet on said housing, the combination of a threaded valve stem passing through said bonnet, a screw stem threaded to engage said valve stem and providing closed upper and lower lubricant chambers, channel means connecting said chambers for passage of lubricant therethrough, and means to rotate said screw stem to raise and lower said valve stem, such movement enlarging one closed chamber and contracting the other and vice versa to transfer lubricant from one lubricant chamber to the other.

6. A lubricating system for a rising stem type valve having a valve housing and a bonnet on said housing, comprising a screw housing extending upwardly from said bonnet, a screw stem threadedly engaging within said screw housing and forming with said screw housing a closed chamber, a valve stem threadedly engaged in said screw stem and carrying a valving member for movement between open and closed positions, the upper portion of said screw stem being counterbored, means closing the upper end of said screw stem forming a closed chamber in said upper end thereof, said valve stem extending into said last-mentioned closed chamber when the valving member is in an open position, channel means connecting said closed chambers, and means for rotating said screw stem to raise and lower said valve stem, such movement enlarging one closed chamber and contracting the other and vice versa to permit the transfer of lubricant from one chamber to the other upon movement of said valve stem.

References Cited by the Examiner
UNITED STATES PATENTS 2,784,934   3/1957   Paulius _____ 251—355 XR ISADOR WEIL, *Primary Examiner.*

WILLIAM F. O'DEA, *Examiner.*